UNITED STATES PATENT OFFICE.

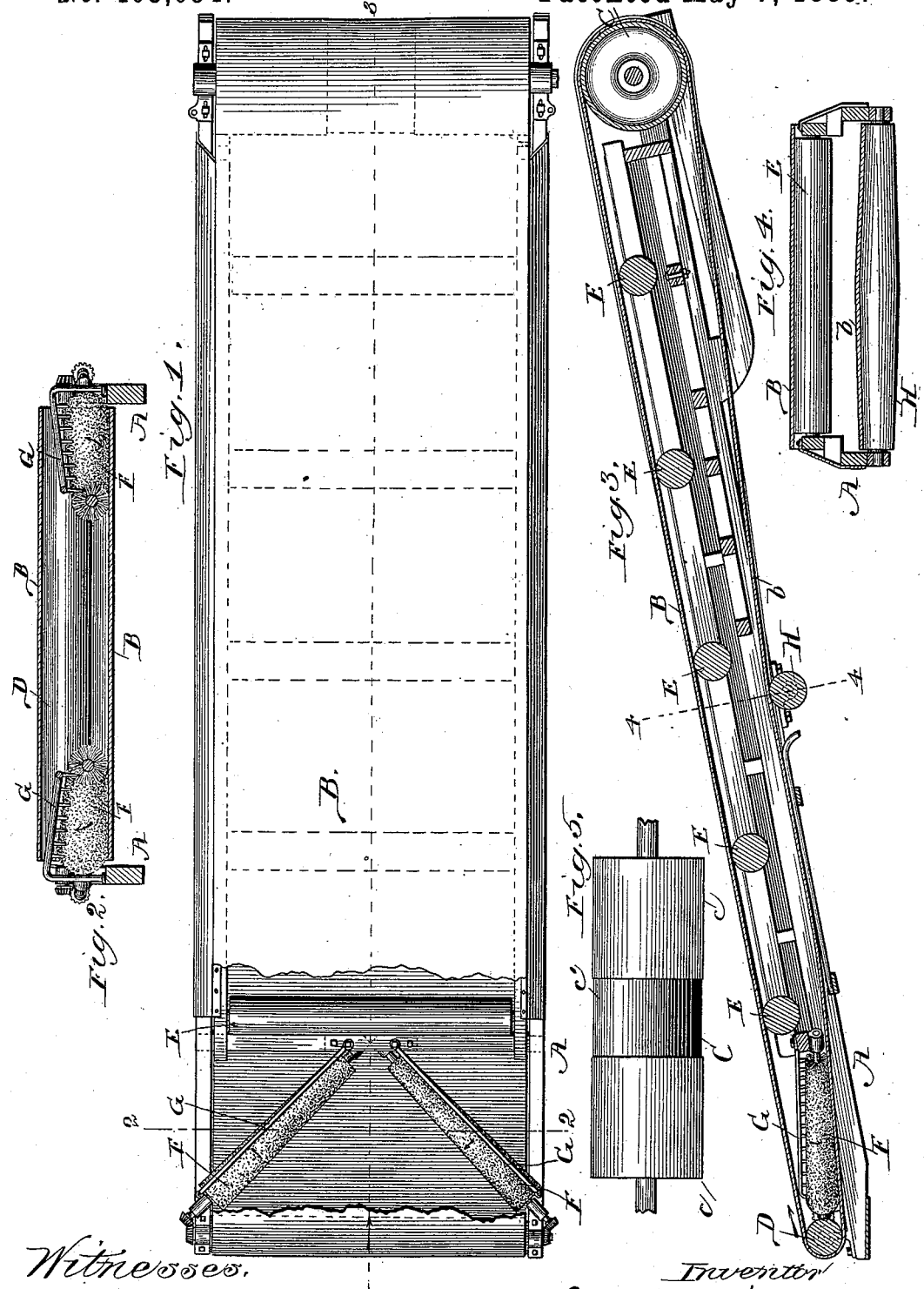

MORTON G. BUNNELL, OF CHICAGO, ILLINOIS, ASSIGNOR TO FREDERICK C. AUSTIN, OF SAME PLACE.

GRADING AND DITCHING MACHINE.

SPECIFICATION forming part of Letters Patent No. 403,034, dated May 7, 1889.

Application filed January 24, 1889. Serial No. 297,446. (No model.)

*To all whom it may concern:*

Be it known that I, MORTON G. BUNNELL, a citizen of the United States, residing at Chicago, in the county of Cook and State of Illinois, have invented a certain new and useful Improvement in Grading and Ditching Machines, of which the following is a specification.

My invention relates to grading and ditching machines of the kind wherein the soil is plowed up and delivered onto the endless conveyer-belt of an inclined elevator, whereby the soil at the receiving end of the elevator may be carried by the conveyer-belt up to the delivery end of the elevator, where it is discharged.

The object of my invention is to effectively clear from the lower leaf of the endless conveyer-belt such soil as may fall or be thrown thereon, whereby during the travel of said belt the belt-rolls, and particularly the belt-roll at the lower receiving end of the elevator, shall be kept free from loose mud and soil, which if allowed to pass to the roll will be so pressed thereon by the belt as to stick to and gum up the roll, and thereby interfere with the free and perfect action of the elevator.

It has heretofore been proposed to provide a scraper for freeing the belt-roll at the receiving end of the elevator from such soil as may adhere thereto; but such arrangement has necessitated the employment of a tray or pan arranged between the leaves of the conveyer-belt in position to catch the soil scraped from off the belt-roll, and hence as soon as such tray or pan has become objectionably loaded stoppage of the machine and a removal of the tray or pan have been necessitated. Furthermore, by such arrangement no means are afforded for freeing the inner side of the endless conveyer-belt from such soil as may adhere thereto. In a machine characterized by my improvement, however, I provide means for removing the soil from the upper or inner side of the lower leaf of the endless conveyer-belt before such soil as may find its way thereon can reach the belt-roll at the receiving end of the elevator; and to such end I arrange between the folds or leaves of the endless conveyer-belt one or more rotary brushes which revolve during the travel of the conveyer-belt, and serve to remove therefrom such soil as may fall or be thrown upon said lower leaf or fold of the conveyer-belt. As a further feature of improvement in this direction, I propose supporting the lower leaf or fold of the endless conveyer-belt by one or more rolls made somewhat tapering from the middle to the ends of the roll, or, what is the same thing, gradually increase the roll in diameter from its ends to its middle point. By such arrangement the lower leaf of the conveyer-belt will slope transversely from its longitudinal middle to its edges, whereby during operation loose soil will work its way off the belt.

In the accompanying drawings, Figure 1 is a top plan view of the elevator with a portion of the endless conveyer-belt broken away for convenience of illustration. Fig. 2 is a tranverse section on line 2 2, Fig. 1. Fig. 3 represents a longitudinal central section taken through the elevator on a vertical plane, indicated by line 3 3, Fig. 1. Fig. 4 is a transverse section on line 4 4, Fig. 3. Fig. 5 represents a large belt-roll that can be employed at the delivery end of the elevator.

In said drawings, A indicates the elevator-frame; B, the endless conveyer-belt; C, the large driving-roll that is arranged at the delivery end of the elevator, and D the belt-roll, which is commonly arranged at the receiving end of the elevator, and which is usually an idler.

The endless conveyer-belt passes, as usual, about the rolls C and D, and also passes over a set of rolls, E, which serve to support the upper fold or leaf of the belt. In front of the roll D, and between the folds or leaves of the conveyer-belt, are a couple of rotary brushes, F, arranged for scraping and sweeping soil from the inner or upper side of the lower fold or leaf of said conveyer-belt.

The brushes can be arranged in various ways relatively to the length of the belt, and, if desired, but one long brush can be employed. I prefer, however, to provide a couple of brushes and to arrange them oblique to the length of the conveyer-belt, and hence obliquely to the direction of travel thereof. The obliquely-arranged brushes herein shown converge from opposite ends of roll D (or points thereabout) toward the delivery end of the elevator, whereby soil carried toward roll D by the lower leaf of the conveyer-belt will be met and arrested by the obliquely-arranged brushes, which, by reason of their aforesaid arrangement, will carry off the soil at the sides of the elevator.

The brushes can be driven in any suitable way—as, for example, they can be journaled in suitable bearings on the elevator-frame and be geared to the journals of the belt-roll D, so that when said roll is driven by the travel of the conveyer-belt it will in turn drive the brushes.

In connection with each brush I provide a cleaner or wiper, G, which can be formed somewhat after the fashion of a comb and be suitably supported on the elevator-frame. The wipers free the brushes from dirt, and also prevent loose dirt from being carried over by and back of the brushes, which in their operation are preferably driven in a direction reverse to the direction of travel of the lower leaf of the conveyer-belt, and hence reverse to the direction of rotation of the roll D.

H indicates a roll arranged for upholding the lower fold or leaf of the endless conveyer-belt. Said roll has a gradual swell from its ends toward its middle, whereby such portion of the lower leaf of the conveyer-belt as may be passing over said roll will slope from its longitudinal middle to its side edges, as illustrated in Fig. 4, wherein the roll H is shown tapered from its longitudinal middle toward its ends, so as to cause the lower leaf, $b$, of the conveyer-belt to slope from its longitudinal middle to its side edges. One or more of such rolls H can be employed, and by such arrangement loose soil, which may have fallen upon the lower leaf of the belt, will, during the travel of the belt, be apt to find its way to and pass off at the edges of the belt. In order to compensate for thus lifting the lower leaf of the conveyer-belt at its longitudinal middle, the end positions, $c$, of the driving-roll C can be made somewhat larger in diameter than its middle portion, $c'$, and as a preferred way of thus enlarging said portions of the driving-roll its end portions can, for example, be covered with sheep-skin, which not only thickens the roll at such points, but also prevents the conveyer-belt from slipping.

The elevator with the foregoing-described matters of improvement can be employed in any suitable or desired construction of grading and ditching machine, as will be readily understood by those skilled in the art without special illustration of such machine.

What I claim as my invention is—

1. The combination, substantially as hereinbefore set forth, with the conveyer-belt, of one or more brushes for sweeping off the soil.

2. The combination, substantially as hereinbefore set forth, with the conveyer-belt, of one or more rotary brushes arranged for sweeping the soil from the belt, and means for revolving said brush or brushes simultaneously with the travel of the conveyer-belt.

3. The combination, substantially as hereinbefore set forth, with the conveyer-belt, of one or more rotary brushes, F, set obliquely to the direction of travel of the conveyer-belt and arranged between the leaves of the same.

4. The combination, with the conveyer-belt and a rotary brush for sweeping soil therefrom, of a cleaner or wiper for said brush, substantially as and for the purpose set forth.

5. The combination, with the conveyer-belt, of a roll supporting the lower leaf of the conveyer-belt and made tapering from its middle toward its ends, substantially as and for the purpose described.

6. The combination, with the conveyer-belt and the roll H, of the driving-roll C, having its end portions of greater diameter than its middle portion, for the purpose described.

7. The combination, with the conveyer-belt and the roll H, of the driving-roll C, having its end portions made of greater diameter than its middle portion by a covering, such as set forth.

MORTON G. BUNNELL.

Witnesses:
CHAS. G. PAGE,
ANNIE COATES.